United States Patent [19]
Long et al.

[11] Patent Number: 6,095,414
[45] Date of Patent: *Aug. 1, 2000

[54] ATM DELIVERY ROLL VALIDATION

[75] Inventors: John Long, West Chester; Thomas J. Stillwagon, Englewood, both of Ohio

[73] Assignee: NCR Corporation, Dayton, Ohio

[ * ] Notice: This patent is subject to a terminal disclaimer.

[21] Appl. No.: 09/191,298

[22] Filed: Nov. 13, 1998

[51] Int. Cl.[7] .............................. G06K 15/00; G06F 17/60
[52] U.S. Cl. ............................................. 235/385; 235/383
[58] Field of Search .................................... 235/383, 385, 235/454, 462.01; 902/18

[56] References Cited

U.S. PATENT DOCUMENTS 4,463,251  7/1984  Koutonen et al. ....................... 235/385
5,918,910  7/1999  Stillwagon et al. ..................... 235/385

OTHER PUBLICATIONS

U.S. application No. 08/994,698 entitled "Product Tracking System and Method", filed Dec. 19, 1997, and assigned to NCR Corporation (Attorney Docket No. 7541).

*Primary Examiner*—Donald Hajec
*Assistant Examiner*—Larry D Taylor
*Attorney, Agent, or Firm*—Francis L. Conte

[57] ABSTRACT

Barcodes are assigned to respective receipt printers for identification thereof, and customized receipt rolls are also assigned barcodes for identification thereof. A receipt roll may then be associated with a corresponding one of the receipt printers for allowing scanning of the respective barcodes for identification thereof, followed by comparing the scanned barcodes for validating matches therebetween.

10 Claims, 2 Drawing Sheets

ATM DELIVERY ROLL VALIDATION

BACKGROUND OF THE INVENTION

The present invention relates generally to point of sale (POS) terminals and automated teller machines (ATMs), and, more specifically, to receipt printers therefor.

A typical POS terminal is found in a retail establishment, such as a supermarket, for completing a purchase transaction. Products being purchased are itemized on a list which is printed upon completion of the transaction. Similarly, an ATM prints a receipt upon completion of a typical banking transaction.

Both machines use conventional printers in the exemplary form of either dot matrix printers or thermal printers for printing on demand the relevant information for each transaction. These printers are also being adapted for additionally dispensing various promotions either printed on demand or preprinted on the receipt paper.

Preprinted promotions may be provided in any conceivable form for promoting various products or services. For example, the promotions may include product coupons having a redeemable value for a monetary rebate or multiple product purchase at discount price. The promotions may also include various banking services such as certificates of deposit and various loans at promotional rates.

Product and service promotion is typically tailored or customized across given geographical regions such as within the United States. Based on various marketing objectives, different promotions are offered in different regions across the United States.

However, the paper receipt rolls used for the receipt printers in the POS terminals and ATMs are typically manufactured in a relatively few production plants which typically cover more than one region. Accordingly, when the receipt rolls are manufactured with different preprinted promotions thereon intended for delivery to different geographic regions, suitable care must be exercised to ensure the proper delivery of the different receipt rolls to the proper geographic regions for use in the corresponding receipt printers. This may be manually accomplished by providing suitable identification labels on the cartons containing several receipt rolls, and maintaining a manual tracking system to ensure that the identified cartons are delivered to corresponding regions.

As marketing activities become increasingly targeted to small geographic regions, including individual POS terminals or ATMs, the difficulty of controlling inventory, tracking movement of the customized receipt rolls, and validating delivery to the correct receipt printer correspondingly increases. Furthermore, some preprinted receipt rolls may be time limited in usefulness and must be timely delivered to the correct receipt printer for use by intended customers.

Accordingly, it is desired to improve the delivery process of customized receipt rolls to selected receipt printers in various machines such as POS terminals and ATMs.

BRIEF SUMMARY OF THE INVENTION

Barcodes are assigned to respective receipt printers for identification thereof, and customized receipt rolls are also assigned barcodes for identification thereof. A receipt roll may then be associated with a corresponding one of the receipt printers for allowing scanning of the respective barcodes for identification thereof, followed by comparing the scanned barcodes for validating matches therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
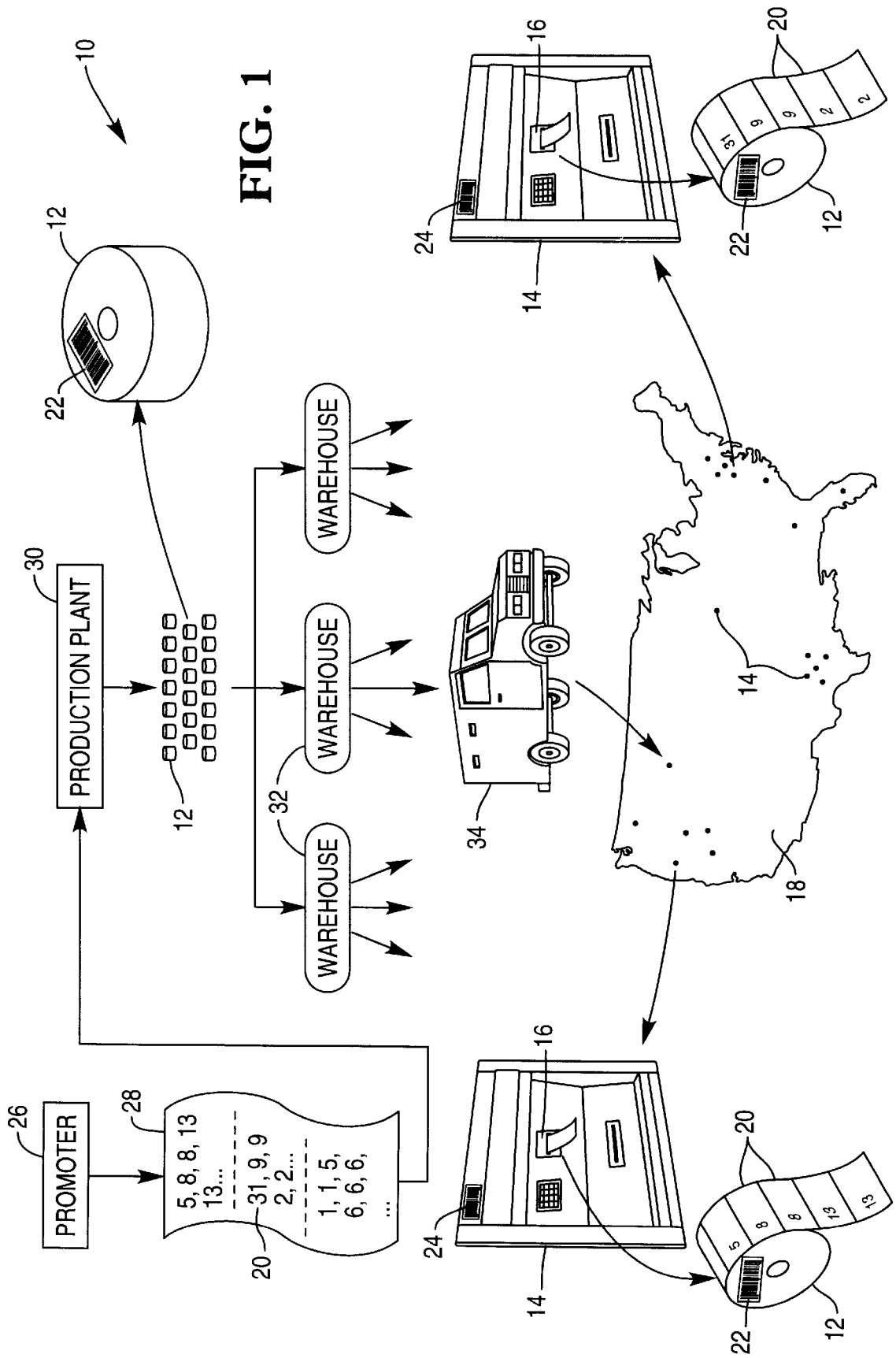
FIG. 1 is a schematic representation of an exemplary system for validating delivery of a receipt roll to one a plurality of receipt printers in corresponding transaction machines over exemplary regions in the United States for example, in accordance with an exemplary embodiment of the present invention.

Illustrated schematically in FIG. 1 is a system 10 for validating delivery of a plurality of receipt rolls 12 to corresponding ones of a plurality of transaction machines 14 each having a corresponding receipt printer 16 therein. The transaction machines 14 may be located in different geographical regions 18 represented, for example, by any suitable division of the territory of the United States.

The transaction machines 14 may take any conventional form such as point of sale (POS) terminals typically used in retail stores for completing purchase transactions and providing a written receipt therefor. Or, the transaction machines may be in the form of conventional automated teller machines (ATMs) typically used for self-service banking transactions for depositing or withdrawing money for example.

The receipt printer 16 of these machines may take any conventional form such as dot matrix printers or thermal printers in which is suitably mounted the receipt roll 12 which may be used for printing thereon any relevant transaction information pertaining to the retail sale for the POS application or for the banking transaction for the ATM application.

As indicated above, the receipt rolls 12 themselves may be used for offering certain promotions 20 which may take any conceivable form as marketing objectives dictate. For example, a typical promotion 20 may be a coupon redeemable for monetary value or reduced price product purchase. The promotion may advertise banking services such as certificates of deposit or various loans at promotional rates. Such promotions 20 may be customized or tailored for specific geographic regions 18 of the United States for example, thusly requiring that the corresponding receipt rolls 12 be differently configured with different promotions for different receipt printers 16 for different machines 14.

In accordance with the present invention, the delivery system 10 is specifically configured for validating delivery of specific receipt rolls 12 to specific receipt printers 16 in the corresponding machines 14 for ensuring that the correct promotions are offered in the correct machine in the correct region 18 in a timely manner. The system is effected by assigning a barcode 22 to each of the receipt rolls 12 when they are manufactured for identification thereof, and corresponding to the specific promotions 20 preprinted thereon. The receipt roll barcode 22 may take any conventional form such as the UPC one-dimensional barcode which may be directly printed upon the individual rolls, or printed on an adhesive label attached to the individual rolls, or attached to a shipping carton containing a group of similar rolls.

Correspondingly, a barcode 24 is assigned to each of the printers 16, or the associated transaction machine 14, for identification thereof. Since each machine 14 has a specific geographic location, the associated barcode 24 therefor uniquely identifies not only the machine and its printer but also the geographic location.

Accordingly, the individual receipt roll barcodes 22 may be scanned for identification thereof, and, the printer barcode 24 may also be scanned to identify the specific printer, and the scanned barcodes may then be compared with a predetermined association thereof for validating a match between a receipt roll and its intended printer, or invalidating a mismatch therebetween.

In the exemplary embodiment illustrated in FIG. 1, the transaction machines 14 are shown in the form of conventional ATMs each having a respective receipt printer 16 for conducting typical consumer banking transactions at hundreds if not thousands of different sites across the United States. Accordingly, each of the receipt rolls 12 is suitably differently configured to include different promotions 20 as desired for the different geographic regions 18 in which the various ATMs 14 are located.

In any one region, the receipt rolls 12 may be identical to each other and include thereon preprinted promotions 20 of various forms. In this way, as different customers use the ATM 14 and receive respective receipts therefrom, the receipts are dispensed and cut from the common receipt rolls 12 therein. Any one or more different promotions may be offered at the individual ATMs in a given region. And, different promotions may be offered in the different regions, and in the most flexible situation, each of the many ATMs may include a receipt roll 12 having different promotions 20 thereon as compared to the other ATMs.

Since a considerable number of the ATMs may be involved, each of which can use a significant number of receipt rolls 12 over a given time period, inventory control, tracking, and validation of the intended receipt rolls 12 for specific ATMs 14 becomes more complex.

The promotion process typically begins with a promoter or marketeer 26 responsible for tailoring various promotions to the different regions 18 as desired for typically marketing objectives. The promoter 26 may simply provide a main electronic file 28 in any conventional machine readable form such as magnetic disk, magnetic tape, or even direct wire transfer. The main file 28 includes the various desired promotions 20, simply identified in FIG. 1 by different numeral designations therefor. The promotions 20 may take any suitable form typically including alphanumeric characters and suitable graphics as desired for communicating to the customer the intended promotion. The promotions found in the main file 28 are grouped for the specific receipt rolls 12 for specific regions 18 and including specific ATMs 14.

The main file 28 is suitably communicated to a production plant 30 wherein the individual receipt rolls 12 are manufactured and preprinted with the desired promotions 20 thereon. A given plant 30 will produce thousands of receipt rolls 12 which may be suitably identified by assigning or affixing thereto a unique barcode 22 for identification thereof.

From the production plant, the many receipt rolls 12 are packed in shipping boxes, such as four to a box, and conventionally delivered to one or more warehouses 32 across the various regions 18. The warehouses 32 provide temporary storage for the receipt rolls 12 in a typical fashion for being timely available to replenish the various ATMs 14 as required. In the ATM example, a distributor or cash replenisher 34, typically in the form of an armored car transport service, periodically delivers the receipt rolls 12, as well as cash, to the various ATMs 14 when needed. The use of the custom receipt rolls 12 being different for different ATMs increases the complexity of the delivery process since extra care must be exercised by the cash replenisher 34 to ensure the correct installation of the intended receipt roll with the corresponding ATM.

Figure 2:
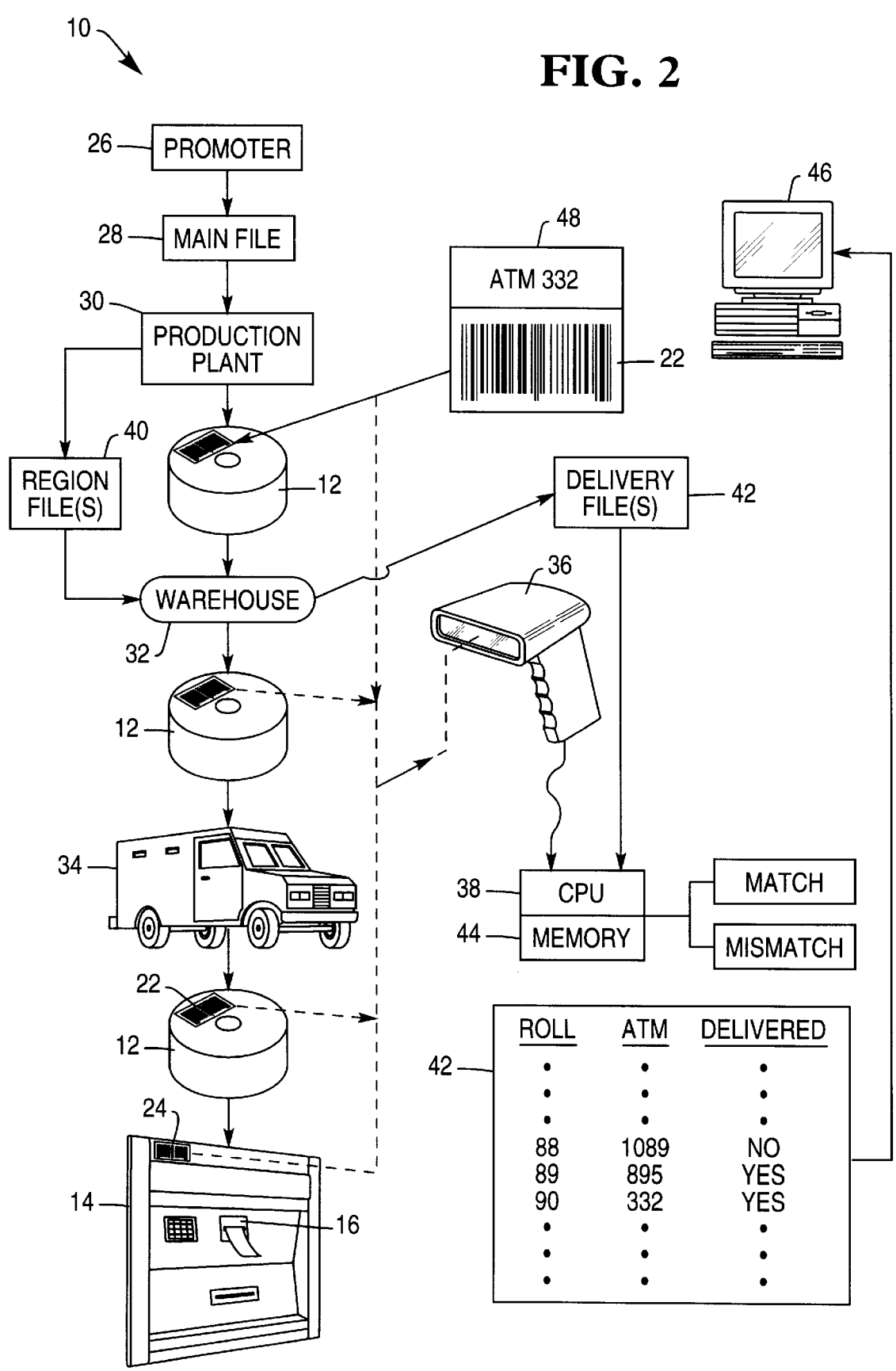
FIG. 2 is a exemplary flowchart representation of the delivery validating system illustrated in FIG. 1 in accordance with an exemplary embodiment of the present invention.

The delivery process is substantially improved in accordance with the present invention as illustrated in more detail in FIG. 2. A barcode scanner 36 is provided for use by the replenisher 34 in making deliveries to ATMs 14. The scanner 36 may take any conventional form such as a typical portable scanner that emits a laser beam scan line which is reflected off the dark bars and light spaces of the barcodes for decoding the respective barcodes in a cooperating central processing unit (CPU) or processor 38. The barcode scanner 36 is therefore effective for scanning the barcodes on the individual receipt rolls 12 for determining the unique identification thereof, and scanning the barcodes 24 on the ATMs 14 for determining the unique identification thereof.

The main data file 28 initially associates each of the receipt rolls 12 to a corresponding one of the intended ATMs 14. This data may be broken up into the different regions, and a corresponding region data file 40 may be provided for each of the regions and each of the warehouses 32 for identifying or associating respective ones of the receipt rolls 12 and the intended printers 16 with the servicing warehouse 32. The delivery file 40 is therefore a subset of the main file 28 and may be used to advantage in controlling inventory, tracking delivery of the individual receipt rolls 12, and validating delivery of the rolls in the respective ATMs.

Since the plurality of receipt rolls 12 are preferably customized and differently configured from each other with the different promotions therein, they also include different barcodes 22 having different identifications. The list of individual receipt rolls 12 as identified by their respective barcodes, and associated with the intended ATMs identified by their different barcodes, is initially found in the main file 28 which may be downloaded to the different region files 40, which in turn may be also downloaded to a corresponding delivery data file 42 for each delivery run of the cash replenisher 34.

The delivery file 42 is suitably downloaded into a corresponding memory 44 of the scanner for being accessed by the processor 38 thereof. In a simple embodiment, the delivery file 42 includes a list of the receipt rolls 12 for a given delivery run, as identified by their barcodes, and a barcode identification of the intended ATM or receipt printer therefor.

The delivery file 42 therefore identifies the associated barcodes for the receipt rolls and the corresponding barcodes for the ATMs 14 or their printers 16. The processor 38 may be suitably programmed for comparing the scanned barcodes of the individual receipt rolls with the scanned barcodes at the specific ATM being visited. In this way by simply scanning the barcode of the receipt roll 12 followed in turn by scanning the barcode of the ATM, the processor 38 automates the comparison process to determine whether a match exists between the roll and the visited ATM for validating the correct correspondence therebetween, or invalidating the specific receipt roll as not matching the visited ATM.

The cash replenisher will only be permitted to install the specific receipt roll 12 identified by its barcode for installation in the intended ATM 14 identified by its barcode. This will prevent installation of a customized receipt roll 12 in an ATM for which it is not intended. When validation of the correct receipt roll with the correct ATM is made, the cash replenisher 34 may then install that roll into that ATM and so indicate to the scanner s processor 38 which will update the delivery file 42 for confirming delivery thereof.

An additional advantage of using the identifying barcodes 22 for the receipt rolls 12 is providing the ability to track each of the rolls from the production plant 30 to the individual ATMs or their printers. Since the barcodes are affixed to the individual rolls or their shipping cartons at the production plant 30 they then may be tracked by scanning the barcodes thereof and storing the data in a suitable electronic file, such as the region data files 40.

The rolls 12 may be temporarily stored in the respective warehouses 32 prior to delivery to the individual ATMs as required. The barcodes 22 may therefore also be used for maintaining inventory identification of the individual rolls in the respective warehouses 32. Inventory control and tracking data may be stored in the region files 40 and individual delivery files 42 and updated upon delivery to the specific ATMs.

The updated delivery file 42 may be suitably downloaded to another computer 46, such as a conventional personal computer, which may be specifically programmed for tracking and inventory control. The region files 40 are suitably downloaded into the computer 46 as the receipt rolls are placed into inventory, and the inventory count may then be adjusted as the individual rolls are delivered to their intended ATMs.

Accordingly, the use of conventional barcodes on the individual customized receipt rolls 12 and the corresponding ATMs 14 provides an effective solution for automating and validating delivery of customized receipt rolls to their intended ATMs. The barcode scanner 36 greatly simplifies validation, tracking, and inventory control since identification of the rolls and ATMs is effected primarily by barcode scanning.

As an aid in tracking and delivering the individual rolls 12, a corresponding shipping label 48, as shown in FIG. 2, may contain any useful information for visually indicating the identification of the intended ATM by either a serial number therefor, or a local address therefor, or both. In the way, the cash replenisher may visually determine which rolls are intended for which ATMs which may then be confirmed or validated using the scanner 36 at the time of delivery.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A method of validating delivery of a receipt roll to one of a plurality of receipt printers comprising:

assigning a barcode to said roll for identification thereof;

assigning a barcode to each of said printers for identification thereof;

associating said roll to a corresponding one of said printers;

scanning said roll and printer barcodes for identification thereof; and comparing said scanned barcodes with said association for validating a match therebetween, and invalidating a mismatch therebetween.

2. A method according to claim 1 further comprising:

a plurality of said receipt rolls being differently configured and each having a different barcode;

a delivery file identifying associated barcodes for said rolls and printers; and comparing said scanned barcodes with said delivery file for validating matches therebetween.

3. A method according to claim 2 further comprising tracking each of said rolls from a production plant to said printers by scanning said barcodes thereof.

4. A method according to claim 3 further comprising:

temporarily storing said rolls prior to delivery to said printers; and maintaining inventory identification of said rolls in said temporary storage.

5. A method according to claim 4 wherein said printers are disposed in respective automated teller machines.

6. A system for validating delivery of a receipt roll to one of a plurality of receipt printers comprising:

a barcode assigned to said roll for identification thereof;

a barcode assigned to each of said printers for identification thereof;

a delivery file identifying an assigned one of said printers for said receipt roll;

a barcode scanner for scanning said roll and printer barcodes for identification thereof; and a processor operatively joined with said scanner for comparing said barcodes with said delivery file for validating a match therebetween, and invalidating a mismatch therebetween.

7. A system according to claim 6 further comprising a plurality of said receipt rolls being differently configured and each having a different barcode, and wherein said delivery file identifies associated barcodes for said rolls and printers.

8. A system according to claim 7 further comprising:

a production plant for producing said receipt rolls;

a warehouse for storing said receipt rolls; and a region file associating respective ones of said receipt rolls and printers with said warehouse, with said delivery file being a subset thereof.

9. A system according to claim 8 further comprising a plurality of automated teller machines each having a respective one of said receipt printers.

10. A system according to claim 9 wherein each of said receipt rolls is differently configured to include different promotions.

* * * * *